US009905840B2

(12) United States Patent
Kwak et al.

(10) Patent No.: US 9,905,840 B2
(45) Date of Patent: Feb. 27, 2018

(54) CATHODE ACTIVE MATERIAL AND METHOD OF PREPARING THE SAME

(71) Applicant: LG Chem, Ltd., Seoul (KR)

(72) Inventors: Ick Soon Kwak, Daejeon (KR); Seung Beom Cho, Daejeon (KR); Hwa Seok Chae, Daejeon (KR)

(73) Assignee: LG Chem, Ltd. (KR)

( * ) Notice: Subject to any disclaimer, the term of this patent is extended or adjusted under 35 U.S.C. 154(b) by 463 days.

(21) Appl. No.: 14/515,036

(22) Filed: Oct. 15, 2014

(65) Prior Publication Data

US 2015/0037678 A1 Feb. 5, 2015

Related U.S. Application Data

(63) Continuation of application No. PCT/KR2014/006844, filed on Jul. 25, 2014.

(30) Foreign Application Priority Data

Jul. 26, 2013 (KR) ........................ 10-2013-0089071

(51) Int. Cl.
*H01M 4/36* (2006.01)
*H01M 4/131* (2010.01)
(Continued)

(52) U.S. Cl.
CPC ........... *H01M 4/131* (2013.01); *C01B 35/128* (2013.01); *C01G 45/00* (2013.01);
(Continued)

(58) Field of Classification Search
CPC ........... H01M 10/0525; H01M 4/0402; H01M 4/0471; H01M 4/131; H01M 4/366;
(Continued)

(56) References Cited

U.S. PATENT DOCUMENTS 5,478,674 A 12/1995 Miyasaka
5,783,328 A 7/1998 Wang
(Continued)

FOREIGN PATENT DOCUMENTS

CN 1228620 A 9/1999
CN 1461066 A 12/2003
(Continued)

OTHER PUBLICATIONS

Machine Translation of: KR 1999-0071411A, Kwon et al., Oct. 14, 1998.*
(Continued)

*Primary Examiner* — Kenneth J Douyette
(74) *Attorney, Agent, or Firm* — Lerner, David, Littenberg, Krumholz & Mentlik, LLP

(57) ABSTRACT

Provided are a cathode active material including polycrystalline lithium manganese oxide and a sodium-containing coating layer on a surface of the polycrystalline lithium manganese oxide, and a method preparing the same.
Since the cathode active material according to an embodiment of the present invention may prevent direct contact between the polycrystalline lithium manganese oxide and an electrolyte solution by including the sodium-containing coating layer on the surface of the polycrystalline lithium manganese oxide, the cathode active material may prevent side reactions between the cathode active material and the electrolyte solution. In addition, since limitations, such as the Jahn-Teller distortion and the dissolution of $Mn^{2+}$, may be addressed by structurally stabilizing the polycrystalline lithium manganese oxide, tap density, life characteristics, and charge and discharge capacity characteristics of a secondary battery may be improved.

11 Claims, 3 Drawing Sheets

COATING LAYER
LITHIUM MANGANESE OXIDE

(51) Int. Cl.

| | |
|---|---|
| ***H01M 4/525*** | (2010.01) |
| ***H01M 4/485*** | (2010.01) |
| ***H01M 10/0525*** | (2010.01) |
| ***C01B 35/12*** | (2006.01) |
| ***H01M 4/58*** | (2010.01) |
| ***C01G 45/12*** | (2006.01) |
| ***H01M 4/04*** | (2006.01) |
| ***H01M 4/505*** | (2010.01) |
| ***C01G 45/00*** | (2006.01) |
| *H01M 10/052* | (2010.01) |
| *H01M 4/02* | (2006.01) |

(52) U.S. Cl.

CPC ..... *C01G 45/1214* (2013.01); *C01G 45/1242* (2013.01); *H01M 4/0402* (2013.01); *H01M 4/0471* (2013.01); *H01M 4/366* (2013.01); *H01M 4/485* (2013.01); *H01M 4/505* (2013.01); *H01M 4/525* (2013.01); *H01M 4/5825* (2013.01); *H01M 10/0525* (2013.01); *C01P 2002/32* (2013.01); *C01P 2002/50* (2013.01); *C01P 2002/52* (2013.01); *C01P 2002/54* (2013.01); *C01P 2002/74* (2013.01); *C01P 2004/61* (2013.01); *C01P 2004/62* (2013.01); *C01P 2004/80* (2013.01); *C01P 2004/84* (2013.01); *C01P 2006/12* (2013.01); *C01P 2006/40* (2013.01); *H01M 10/052* (2013.01); *H01M 2004/021* (2013.01); *H01M 2004/028* (2013.01); *H01M 2220/20* (2013.01)

(58) Field of Classification Search

CPC ..... H01M 4/485; H01M 4/505; C01B 35/128; C01G 45/00; C01G 45/1214

See application file for complete search history.

(56) References Cited

U.S. PATENT DOCUMENTS

| | | | | |
|---|---|---|---|---|
| 6,165,647 | A | 12/2000 | Watanabe et al. | |
| 6,248,477 | B1 * | 6/2001 | Howard, Jr. | C01G 45/1242 423/593.1 |
| 6,303,250 | B1 | 10/2001 | Watanabe et al. | |
| 6,413,673 | B1 | 7/2002 | Kasai et al. | |
| 6,465,130 | B1 | 10/2002 | Numata et al. | |
| 6,531,220 | B1 | 3/2003 | Kweon et al. | |
| 6,706,446 | B2 * | 3/2004 | Nakai | H01M 4/131 429/224 |
| 6,730,435 | B1 | 5/2004 | Nakane et al. | |
| 2001/0016285 | A1 * | 8/2001 | Cho | H01M 4/62 429/231.3 |
| 2002/0006550 | A1 | 1/2002 | Yang et al. | |
| 2002/0055042 | A1 | 5/2002 | Kweon et al. | |
| 2002/0061444 | A1 | 5/2002 | Kweon et al. | |
| 2002/0071990 | A1 | 6/2002 | Kweon et al. | |
| 2002/0081494 | A1 * | 6/2002 | Kondo | C01G 45/1242 429/224 |
| 2002/0110736 | A1 * | 8/2002 | Kweon | C01G 45/1221 429/231.1 |
| 2002/0119372 | A1 | 8/2002 | Zhang | |
| 2003/0082452 | A1 | 5/2003 | Ueda et al. | |
| 2003/0087155 | A1 | 5/2003 | Cho et al. | |
| 2004/0013941 | A1 | 1/2004 | Kobayashi et al. | |
| 2004/0202938 | A1 | 10/2004 | Noguchi et al. | |
| 2005/0042514 | A1 | 2/2005 | Sun et al. | |
| 2005/0123832 | A1 | 6/2005 | Tsukuma et al. | |
| 2005/0260496 | A1 | 11/2005 | Ueda et al. | |
| 2006/0194114 | A1 | 8/2006 | Saito | |
| 2006/0222947 | A1 | 10/2006 | Sun et al. | |
| 2009/0087362 | A1 | 4/2009 | Sun et al. | |
| 2009/0253025 | A1 | 10/2009 | Whitacre | |
| 2009/0286164 | A1 | 11/2009 | Wada et al. | |
| 2010/0104944 | A1 | 4/2010 | Saito et al. | |
| 2010/0112448 | A1 | 5/2010 | Yu et al. | |
| 2010/0243952 | A1 | 9/2010 | Kumada et al. | |
| 2010/0288969 | A1 | 11/2010 | Koga et al. | |
| 2010/0327221 | A1 | 12/2010 | Koga et al. | |
| 2011/0001094 | A1 | 1/2011 | Hashiba et al. | |
| 2011/0210287 | A1 | 9/2011 | Koga et al. | |
| 2011/0223483 | A1 | 9/2011 | Koga et al. | |
| 2011/0269018 | A1 * | 11/2011 | Kono | C01G 45/1228 429/217 |
| 2011/0287319 | A1 | 11/2011 | Vogler et al. | |
| 2012/0137508 | A1 | 6/2012 | Oladeji | |
| 2012/0177994 | A1 | 7/2012 | Kim et al. | |
| 2013/0115513 | A1 | 5/2013 | Choi et al. | |
| 2013/0327978 | A1 | 12/2013 | Ko et al. | |

FOREIGN PATENT DOCUMENTS

| | | | | |
|---|---|---|---|---|
| CN | 1633394 | A | 6/2005 | |
| CN | 1773753 | A | 5/2006 | |
| CN | 1263182 | C | 7/2006 | |
| CN | 101855754 | A | 10/2010 | |
| CN | 101887972 | A | 11/2010 | |
| CN | 101958157 | A | 1/2011 | |
| CN | 102593456 | A | 7/2012 | |
| EP | 1491504 | A1 | 12/2004 | |
| EP | 2139058 | A1 | 12/2009 | |
| EP | 2590246 | A1 | 5/2013 | |
| JP | H09265984 | A | 10/1997 | |
| JP | H11-176441 | A | 7/1999 | |
| JP | H11317230 | A | 11/1999 | |
| JP | 2000100433 | A | 4/2000 | |
| JP | 2000-133266 | A | 5/2000 | |
| JP | 2000-215891 | A | 8/2000 | |
| JP | 2001043860 | A | 2/2001 | |
| JP | 2001122628 | A | 5/2001 | |
| JP | 2001-196063 | A | 7/2001 | |
| JP | 2002083631 | A | 3/2002 | |
| JP | 2002124262 | A | 4/2002 | |
| JP | 2002158011 | A | 5/2002 | |
| JP | 2003178759 | A | 6/2003 | |
| JP | 2004083388 | A | 3/2004 | |
| JP | 2005510017 | A | 4/2005 | |
| JP | 2006236886 | A | 9/2006 | |
| JP | 2007294119 | A | 11/2007 | |
| JP | 4197054 | B2 | 12/2008 | |
| JP | 2009152214 | A | 7/2009 | |
| JP | 2009176732 | A | 8/2009 | |
| JP | 2010095439 | A | 4/2010 | |
| JP | 2010097947 | A | 4/2010 | |
| JP | 201037996 | A | 6/2010 | |
| JP | 2011-519122 | A | 6/2011 | |
| JP | 2011525470 | A | 9/2011 | |
| JP | 2011216214 | A | 10/2011 | |
| JP | 4827931 | B2 | 11/2011 | |
| JP | 2012096949 | A | 5/2012 | |
| JP | 2012116746 | A | 6/2012 | |
| JP | 2012146662 | A | 8/2012 | |
| JP | 2014-512638 | A | 5/2014 | |
| KR | 1999/0071411 | A1 * | 10/1998 | H01M 4/48 |
| KR | 19990071411 | A | 9/1999 | |
| KR | 100261120 | B1 | 7/2000 | |
| KR | 2001-0091887 | A | 10/2001 | |
| KR | 2002-0024521 | A | 3/2002 | |
| KR | 2002-0064367 | | 8/2002 | |
| KR | 2002-0087627 | A | 11/2002 | |
| KR | 2002-0092936 | A | 12/2002 | |
| KR | 2005-0049746 | A | 5/2005 | |
| KR | 100565990 | B1 | 3/2006 | |
| KR | 2006-0109305 | A | 10/2006 | |
| KR | 2009-0103133 | A | 10/2009 | |
| KR | 2011-0036897 | A | 4/2011 | |
| KR | 2011-0044936 | A | 5/2011 | |
| KR | 2011-0061565 | A | 6/2011 | |
| KR | 20110076905 | A | 7/2011 | |
| KR | 2011-0108566 | A | 10/2011 | |
| KR | 2011-0111058 | A | 10/2011 | |

(56) References Cited

FOREIGN PATENT DOCUMENTS

| | | | |
|---|---|---|---|
| KR | 2012-0081808 | A | 7/2012 |
| KR | 10-1272042 | B1 | 6/2013 |
| TW | 201008879 | A | 3/2010 |

OTHER PUBLICATIONS

International Search Report from PCT/KR2014/006841, dated Nov. 5, 2014.
International Search Report from PCT/KR2014/006844, dated Nov. 5, 2014.
International Search Report from PCT/KR2014/006843, dated Nov. 5, 2014.
Extended Search Report from European Application No. 14829443.2, dated Dec. 2, 2015.
Halil Sahan et al., "The effect of LBO coating method on electrochemical performance of LiMn2O4 cathode material," Sold State Ionics 178, 35-36, 2008, pp. 1837-42 (Feb. 15, 2008).
European Search Report for Application No. 14827145.5 dated Apr. 30, 2015.
U.S. Appl. No. 14/514,987, filed Oct. 15, 2014.
U.S. Appl. No. 14/514,788, filed Oct. 15, 2014.
Extended Search Report from European Application No. 14814673.1, dated Apr. 14, 2016.
International Search Report for Application No. PCT/KR2014/006839 dated Nov. 5, 2014.
Du, K., et al., "Synthesis and electrochemical performance of layered lithium-sodium manganese oxide as a cathode material for lithium ion batteries." Journal of Power Sources, Apr. 19, 2013, vol. 238, pp. 372-375.
"Zero-Strain Intercalation Cathode for Rechargeable Li-Ion Cell", Cho et al., Agnew Chem Int ed. 40(18), 3367-3369, Sep. 17, 2001.

* cited by examiner

CATHODE ACTIVE MATERIAL AND METHOD OF PREPARING THE SAME

CROSS-REFERENCE TO RELATED APPLICATIONS

The present application is a continuation of International Application No. PCT/KR2014/006844 filed Jul. 25, 2014, which claims priority from Korean Application No. 10-2013-0089071 filed Jul. 26, 2013, the disclosures of which are hereby incorporated herein by reference.

TECHNICAL FIELD

The present invention relates to a cathode active material and a method of preparing the same, and more particularly, to a cathode active material having a sodium-containing coating layer on the surface of polycrystalline lithium manganese oxide particles, and a method of preparing the same.

BACKGROUND ART

In line with growing concerns about environmental issues, research into electric vehicles and hybrid electric vehicles which may replace vehicles using fossil fuels such as gasoline vehicles and diesel vehicles, one of major causes of air pollution, has been conducted.

Research into the use of lithium secondary batteries having high energy density as power sources of the electric vehicles and hybrid electric vehicles has been actively conducted, and some of the research are in a commercialization stage.

Lithium cobalt oxide ($LiCoO_2$) is mainly used as a cathode active material of the lithium secondary batteries, and in addition, the uses of lithium manganese oxides, such as $LiMnO_2$ having a layered crystal structure and $LiMn_2O_4$ having a spinel crystal structure, and lithium nickel oxide ($LiNiO_2$) are also in consideration.

Among these materials, lithium manganese oxides, such as $LiMn_2O_4$, have advantages in that thermal stabilities are excellent and the prices are relatively low, but may have limitations in that capacities are low, cycle characteristics are poor, and high-temperature characteristics are poor.

When considering the structure of $LiMn_2O_4$, lithium (Li) ions are located at tetrahedral sites (8a), manganese (Mn) ions ($Mn^{3+}/Mn^{4+}$) are located at octahedral sites (16d), and $O^{2-}$ ions are located at octahedral sites (16c). These ions form a cubic close-packed arrangement. The 8a tetrahedral sites share faces with the 16c octahedral sites having vacancies therearound to form three-dimensional channels, thereby providing the channels through which $Li^+$ ions are easily move.

In particular, the biggest limitation of $LiMn_2O_4$ is that the capacity decreases as the number of cycles increases. This is due to a structural change known as the "Jahn-Teller distortion", that is, a phase transition from cubic to tetragonal caused by changes in the oxidation number of Mn ion at the end of discharge (near 3 V). Also, the cause of the capacity fading may include a phenomenon of dissolution of manganese into an electrolyte solution.

In order to address these limitations, a significant amount of research into a method of excessively adding Li in an amount of 1.01 to 1.1 times the stoichiometric amount of Li to stoichiometric $LiMn_2O_4$ to prevent the site exchange between Li and Mn metal ions and a method of substituting Mn sites with transition metals or divalent and trivalent cations to control the oxidation number of Mn ion or prevent the phase transition from cubic to tetragonal has been conducted.

These methods may reduce the capacity fading in comparison to that of the stoichiometric $LiMn_2O_4$, but may not address the limitations such as the Jahn-Teller distortion and the dissolution of $Mn^{2+}$.

PRIOR ART DOCUMENTS

Patent Document

Korean Patent Application Laid-Open Publication No. 1999-018077

DISCLOSURE OF THE INVENTION

Technical Problem

An aspect of the present invention provides a cathode active material which may prevent side reactions between the cathode active material and an electrolyte solution, and may improve tap density, life characteristics, and charge and discharge capacity characteristics of a secondary battery by addressing limitations such as the Jahn-Teller distortion and the dissolution of $Mn^{2+}$.

Another aspect of the present invention provides a method of preparing the cathode active material.

Another aspect of the present invention provides a cathode including the cathode active material.

Another aspect of the present invention provides a lithium secondary battery including the cathode.

Technical Solution

According to an aspect of the present invention, there is provided a cathode active material including: polycrystalline lithium manganese oxide; and a sodium-containing coating layer on a surface of the polycrystalline lithium manganese oxide.

According to another aspect of the present invention, there is provided a method of preparing the cathode active material including: (i) coating a surface of a polycrystalline manganese precursor with a sodium-containing compound by mixing the polycrystalline manganese precursor and a sodium precursor and performing a heat treatment; and (ii) forming a sodium-containing coating layer on a surface of polycrystalline lithium manganese oxide by mixing the manganese precursor coated with the sodium-containing compound and a lithium precursor and sintering the mixture.

According to another aspect of the present invention, there is provided a method of preparing the cathode active material including mixing a polycrystalline manganese precursor, a sodium precursor, and a lithium precursor, and sintering the mixture.

According to another aspect of the present invention, there is provided a cathode including the cathode active material.

According to another aspect of the present invention, there is provided a lithium secondary battery including the cathode.

Advantageous Effects

Since a cathode active material according to an embodiment of the present invention may prevent direct contact between polycrystalline lithium manganese oxide and electrolyte solution by including a sodium-containing coating layer on the surface of the polycrystalline lithium manganese oxide, the cathode active material may prevent side reactions between the cathode active material and the electrolyte solution. In addition, since limitations, such as the Jahn-Teller distortion and the dissolution of $Mn^{2+}$, may be addressed by structurally stabilizing the lithium manganese oxide, tap density, life characteristics, and charge and discharge capacity characteristics of a secondary battery may be improved.

Also, according to a preparation method according to an embodiment of the present invention, crystals of polycrystalline lithium manganese oxide may be easily grown at low temperature and the surface of the polycrystalline lithium manganese oxide may be uniformly coated with a sodium-containing coating layer.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

Figure 1:
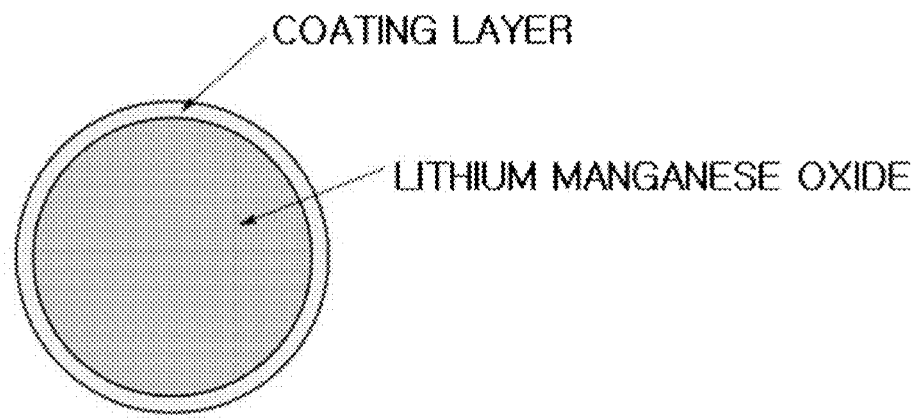
FIG. 1 is a schematic view illustrating a cathode active material according to an embodiment of the present invention.

As illustrated in FIG. 1, a cathode active material according to an embodiment of the present invention may include polycrystalline lithium manganese oxide; and a sodium-containing coating layer on the surface of the polycrystalline lithium manganese oxide.

In general, spinel-structured lithium manganese oxide, e.g., $LiMn_2O_4$, has limitations such as the possibility of the fast diffusion of lithium ions due to its structural characteristics of having a lithium movement path, high capacity but the instability of an electrolyte in a high voltage range, the Jahn-Teller distortion of $Mn^{3+}$ during heavy discharge, and the dissolution of manganese ions ($Mn^{2+}$) during discharge.

Specifically, in $LiMn_2O_4$, $Mn^{3+}$ relatively increases in comparison to $Mn^{4+}$ under the condition in which lithium ions are insufficient in the lattice or under heavy discharge conditions. As a result, the distortion of the structure occurs, and a phase transition from cubic to tetragonal occurs due to the changes in the oxidation number of Mn ions during continuous charge and discharge caused by the increase in unstable $Mn^{3+}$. Eventually, the reversibility of the structure may be reduced.

Also, the dissolution of Mn ions eventually causes capacity fading while unstable $Mn^{3+}$ changes to $Mn^{2+}$ and $Mn^{4+}$ on the surface of an electrode through an exchange reaction between the $Mn^{3+}$ ions, the generated $Mn^{2+}$ ions are dissolved in an acidic electrolyte to decrease the amount of an active material, and the dissolved $Mn^{2+}$ ions are precipitated as metal at an anode to obstruct the movement of lithium ions. Thus, the dissolution of Mn ions may reduce the life characteristics of a secondary battery.

In contrast, since the cathode active material according to the embodiment of the present invention may include structurally stable polycrystalline lithium manganese oxide having particles in a curved round shape by blunting the edges (corner portions) of the lithium manganese oxide, the cathode active material may address the limitations, such as the Jahn-Teller distortion and the dissolution of $Mn^{2+}$. Thus, the life characteristics, and charge and discharge capacity characteristics of a secondary battery may be improved.

Also, since the sodium-containing coating layer may be included on the surface of the polycrystalline lithium manganese oxide, tap density may increase, rolling density may increase, and the direct contact between the polycrystalline lithium manganese oxide and an electrolyte solution may be prevented to suppress side reactions between the cathode active material and the electrolyte solution.

In the cathode active material according to the embodiment of the present invention, the polycrystalline lithium manganese oxide may be represented by Chemical Formula 1:

$$Li_{(1+x)}Mn_{(2-x-y)}Al_yO_{(4-z)}$$ <Chemical Formula 1> where x, y, and z respectively satisfy $0 \le x \le 0.2$, $0 < y \le 0.2$, and $0 \le z \le 0.2$.

In the cathode active material according to the embodiment of the present invention, the polycrystalline lithium manganese oxide has a form in which a part of manganese sites in a spinel lithium manganese oxide is substituted with aluminum (Al).

In the polycrystalline lithium manganese oxide particles according to an embodiment of the present invention, the term "polycrystal" denotes a crystal composed of two or more crystal particles having an average crystal diameter of 152 nm to 300 nm, preferably 155 nm to 250 nm, and most preferably 150 nm to 210 nm.

Also, in the present specification, the crystal particles constituting the polycrystal may denote primary particles. The polycrystal may denote a form of a secondary particle in which the primary particles are agglomerated, and may be a spherical or nearly spherical polycrystal.

Also, in the cathode active material according to the embodiment of the present invention, the sodium-containing coating layer may include a sodium oxide. The sodium-containing coating layer may act as a protective layer that prevents the direct contact between the cathode active material and the electrolyte solution, and may increase tap density by forming a coating layer on the lithium manganese oxide particles to obtain high rolling density. Thus, the sodium-containing coating layer may be advantageous in the field of secondary batteries, particularly, vehicles. In addition, since an amount of lithium remaining on the surface of the cathode active material may be reduced, a swelling phenomenon of the secondary battery may be reduced and the life characteristics thereof may be improved.

Specifically, the sodium oxide, for example, may include $Na_2O$.

In the cathode active material according to the embodiment of the present invention, a thickness of the sodium-containing coating layer may be in a range of 1 nm to 500 nm, and an amount of the sodium oxide included in the coating layer may be in a range of about 0.01 wt % to about 20 wt % based on a total weight of the cathode active material.

In the case that the thickness of the coating layer is less than 1 nm, since the coating layer formed on the surface of the polycrystalline lithium manganese oxide is excessively thin, an effect of suppressing the side reactions between the cathode active material and the electrolyte solution may be insignificant. In the case in which the thickness of the coating layer is greater than 500 nm, since the coating layer is excessively thick, electrochemical properties may be reduced due to an increase in resistance.

Also, according to an embodiment of the present invention, the lithium manganese oxide may be doped with some sodium (Na) atoms of sodium-containing oxide, and the lithium manganese oxide may have a concentration gradient in which an amount of the Na gradually decreases from the surface of the lithium manganese oxide to the inside thereof.

In the cathode active material according to the embodiment of the present invention, an average particle diameter ($D_{50}$) of a secondary particle, in which primary particles of the polycrystalline lithium manganese oxide are agglomerated, may be in a range of 3 μm to 20 μm. In the case that the average particle diameter of the secondary particle is less than 3 μm, the stability of the polycrystalline lithium manganese oxide particles may be reduced, and in the case in which the average particle diameter of the secondary particle is greater than 20 μm, the output characteristics of the secondary battery may be reduced.

In the present invention, the average particle diameter ($D_{50}$) of the particles may be defined as a particle diameter at 50% in a cumulative particle diameter distribution. The average particle diameter ($D_{50}$) of the particles according to the embodiment of the present invention, for example, may be measured by using a laser diffraction method. The laser diffraction method may generally measure a particle diameter ranging from a submicron level to a few mm, and may obtain highly repeatable and high resolution results.

A method of measuring the average particle diameter ($D_{50}$) of particles according to an embodiment of the present invention, for example, may be performed in such a manner that the polycrystalline lithium manganese oxide particles or the cathode active material is dispersed in a solution, the solution is introduced into a commercial laser diffraction particle size measurement instrument (e.g., Microtrac MT 3000) and irradiated with ultrasonic waves having a frequency of about 28 kHz and an output of 60 W, and the average particle diameter ($D_{50}$) at 50% in a cumulative particle diameter distribution of the measurement instrument may then be calculated.

Also, the cathode active material according to the embodiment of the present invention may have an effect of reducing the frictional area of the surface by including the sodium-containing coating layer on the surface of the polycrystalline lithium manganese oxide, and thus, the tap density of the cathode active material may be improved. The tap density may be in a range of 1.7 g/cc to 2.5 g/cc, wherein the tap density may vary according to the secondary particle diameter of the polycrystalline lithium manganese oxide.

Furthermore, according to an embodiment of the present invention, an average crystal diameter of the primary particles of the cathode active material may be quantitatively analyzed using X-ray diffraction analysis. For example, the cathode active material is put in a holder and diffraction data obtained by irradiating the particles with X-ray are analyzed so that the average crystal diameter of the primary particles may be quantitatively analyzed.

In X-ray diffraction analysis of the cathode active material according to the present invention, the cathode active material may have a structure in which (311), (400), and (440) planes are particularly grown with respect to a (111) plane.

Specifically, when a peak intensity ratio of I(111)/I(111) is defined as 100% in the X-ray diffraction analysis, I(311)/I(111) may be 40% or more, I(400)/I(111) may be 40% or more, and I(440)/I(111) may be 20% or more.

Also, according to an embodiment of the present invention, a full width at half maximum (FWHM) of a (311) peak of the cathode active material in X-ray diffraction analysis may be 0.3 degrees or less.

In the present invention, the FWHM quantifies a peak width at a half position of the (311) peak intensity which is obtained by the X-ray diffraction of the cathode active material.

The FWHM may be represented as degrees)(°, i.e., the unit of 2θ, and the higher the crystallinity of the polycrystalline lithium manganese oxide particles is, the lower the value of the FWHM is.

Also, a Brunauer-Emmett-Teller (BET) specific surface area of the cathode active material according to the embodiment of the present invention may be in a range of 0.1 $m^2/g$ to 1.0 $m^2/g$. In the case that the BET specific surface area is outside the above range, the output characteristics of the secondary battery may be reduced.

According to an embodiment of the present invention, the specific surface area of the cathode active material may be measured by a BET method. For example, the specific surface area may be measured by a 6-point BET method according to a nitrogen gas adsorption-flow method using a porosimetry analyzer (Belsorp-II mini by Bell Japan Inc.).

The present invention may provide a method of preparing the cathode active material, and for example, the cathode active material may be prepared by two methods. That is, there are a method (first preparation method) of mixing a manganese precursor coated with a sodium-containing compound and a lithium precursor, and then sintering the mixture, and a method (second preparation method) of mixing a manganese precursor, a sodium precursor, and a lithium precursor together, and sintering the mixture.

Specifically, the first preparation method of the cathode active material according to an embodiment of the present invention may include: (i) coating a surface of a polycrystalline manganese precursor with a sodium-containing compound by mixing the polycrystalline manganese precursor and a sodium precursor and performing a heat treatment; and (ii) forming a sodium-containing coating layer on a surface of polycrystalline lithium manganese oxide by mixing the manganese precursor coated with the sodium-containing compound and a lithium precursor and sintering the mixture.

Also, the second preparation method of the cathode active material according to another embodiment of the present invention may provide a method of preparing the cathode active material including mixing a polycrystalline manganese precursor, a sodium precursor, and a lithium precursor, and sintering the mixture.

According to an embodiment of the present invention, a dry method with low production costs may be used to easily prepare polycrystalline lithium manganese oxide particles having better performance than those prepared by a wet method. In particular, crystals of the polycrystalline lithium manganese oxide may be easily grown at low temperature and the surface of the polycrystalline lithium manganese oxide may be uniformly coated with a sodium-containing coating layer.

The sodium precursor used according to the embodiment of the present invention may be used for the formation of the surface coating layer of the polycrystalline lithium manganese oxide, and simultaneously, may reduce a dissolution area of manganese by forming edges (corner portions) of the polycrystalline lithium manganese oxide particles into a curved round shape by blunting the edges thereof.

In the first preparation method according to the embodiment of the present invention, step (i) may be a step of coating the surface of the polycrystalline manganese precursor with the sodium-containing compound by mixing the polycrystalline manganese precursor and the sodium precursor and performing a heat treatment.

According to an embodiment of the present invention, the preparation method may further include performing a solid-liquid separation process before the heat treatment.

Specifically, the coating may be performed by wet mixing a polycrystalline manganese precursor with a sodium precursor dissolved in a polar solvent to perform a solid-liquid separation process, and then drying the mixture by a heat treatment.

Sodium carbonate, sodium silicate, and sodium hydroxide, or a mixture of two or more thereof may be used as the sodium precursor used according to the embodiment of the present invention. The sodium precursor may be used in an amount of 0.01 wt % to 20 wt % based on a total weight of the polycrystalline manganese precursor.

Water, ethanol, acetone, or a mixed solvent thereof may be used as the polar solvent, and the sodium precursor may be dissolved in the polar solvent, for example, ethanol, and may then be mixed with the manganese precursor.

The solid-liquid separation process used according to the embodiment of the present invention is a process used for the purpose of removing sulfur and sodium that remain on the surface of the precursors after mixing the precursors, and for example, the solid-liquid separation process may be performed by at least one method selected from the group consisting of centrifugal separation, filter press, filter drying, and spray drying methods.

After the centrifugal separation, a polycrystalline manganese precursor may be obtained in which the surface of the polycrystalline manganese precursor is coated with a sodium-containing compound by heat treating in a temperature range of about 120° C. to about 300° C. for about 5 hours to about 48 hours.

In the case that the surface of the polycrystalline manganese precursor is uniformly coated with the sodium-containing compound, the friction between the particles may be minimized and non-uniform particle growth may be controlled.

Thus, since the polycrystalline manganese oxide particles of the present invention obtained using the coated manganese precursor may have good crystallinity and may include a sodium-containing coating layer on the particles, packing efficiency during rolling may be excellent.

In the preparation method according to the embodiment of the present invention, an average particle diameter ($D_{50}$) of the polycrystalline manganese precursor may significantly affect the structural stability of the polycrystalline lithium manganese oxide particles and the performance characteristics of the secondary battery.

The polycrystalline manganese precursor usable according to an embodiment of the present invention may have the form of a polycrystal which is in the form of a secondary particle formed by the agglomeration of primary particles having an average crystal diameter of 100 nm to 300 nm, specifically 152 nm to 300 nm, preferably 155 nm to 250 nm, and most preferably 150 nm to 210 nm. In the polycrystalline manganese precursor, the definition of the term "polycrystal" may be the same as the definition in the polycrystalline lithium manganese oxide.

The average particle diameter ($D_{50}$) of the secondary particle as the polycrystalline manganese precursor may be in a range of 3 μm to 20 μm, for example, 3 μm to 12 μm.

Also, in the manganese precursor according to the embodiment of the present invention, a fine and low-crystalline aluminum compound may exist in the state of being uniformly mixed with the manganese precursor. Al may be included in the manganese precursor in an amount of 0.01 wt % to 10 wt % based on the total weight of the manganese precursor. The polycrystalline manganese precursor including Al may include $(Mn_{(1-y)}Al_y)_3O_4$ ($0<y\leq 0.2$).

Specifically, the polycrystalline manganese precursor including Al may be formed by coprecipitating an aluminum compound and any one selected from the group consisting of $MnO_2$, $MnCl_2$, $MnCO_3$, $Mn_3O_4$, $MnSO_4$, and $Mn_2O_3$, or a mixture of two or more thereof using a coprecipitation method, and thus, the polycrystalline manganese precursor including Al may be obtained in the form of secondary particles in which two or more primary particles are agglomerated. For example, distilled water and aqueous ammonia solution are put in a coprecipitation reactor and the mixture may then be stirred by supplying air into the reactor. Next, a manganese aluminum compound aqueous solution including any one selected from the group consisting of $MnO_2$, $MnCl_2$, $MnCO_3$, $Mn_3O_4$, $MnSO_4$, and $Mn_2O_3$, or a mixture of two or more thereof, and an aluminum compound (e.g., $AlSO_4$) at an appropriate molar ratio, an aqueous ammonia solution as a complexing agent, and an alkaline aqueous solution as a pH adjuster are continuously added to the reactor and then mixed together. Then, a polycrystalline manganese compound $(Mn_{(1-y)}Al_y)_3O_4$ ($0<y\leq 0.2$, for example, $0<y\leq 0.1$) containing Al may be prepared by introducing $N_2$ into the reactor.

The aluminum compound may include any one selected from the group consisting of $AlSO_4$, AlCl, and $AlNO_3$, or a mixture of two or more thereof, but the present invention is not limited thereto.

In the first preparation method of the cathode active material according to the embodiment of the present invention, step (ii) may include mixing the manganese precursor coated with the sodium-containing compound and the lithium precursor and sintering the mixture.

The sintering, for example, may be performed in a temperature range of 600° C. to 900° C. for about 2 hours to about 12 hours.

The lithium precursor may be any one selected from the group consisting of lithium chloride (LiCl), lithium carbonate ($LiCO_3$), lithium hydroxide (LiOH), lithium phosphate ($Li_3PO_4$), and lithium nitrate ($LiNO_3$), or a mixture of two or more thereof.

The second preparation method of the cathode active material according to another embodiment of the present invention may include mixing the polycrystalline manganese precursor, the sodium precursor, and the lithium precursor, and heat treating the mixture.

The precursors used in the second preparation method may be the same as the precursors used in the first preparation method. The heat treatment may be performed in a temperature range of about 600° C. to less than about 800° C.

According to an embodiment of the present invention, in the case that the heat treatment is performed at a high temperature in the above temperature range, the polycrystalline lithium manganese oxide may be doped with some Na atoms of the sodium-containing coating layer.

Also, the present invention provides a cathode including the cathode active material.

The cathode may be prepared according to a typical method known in the art. For example, a binder, a conductive agent, and a dispersant, if necessary, as well as a solvent are mixed with a cathode active material and stirred to prepare a slurry, and a metal current collector is then coated with the slurry and pressed. Thereafter, the cathode may be prepared by drying the metal current collector.

Any metal may be used as the metal current collector so long as it is a metal having high conductivity as well as no reactivity in a voltage range of the battery to which the slurry of the electrode active material may be easily adhered. Non-limiting examples of the cathode current collector may include aluminum, nickel, or a foil prepared by a combination thereof.

An organic solvent, such as N-methylpyrrolidone (NMP), dimethylformamide (DMF), acetone, and dimethylacetamide, or water may be used as the solvent for forming the cathode. These solvents may be used alone or in a mixture of two or more thereof. An amount of the solvent used may be sufficient if the solvent may dissolve and disperse the cathode active material, the binder, and the conductive agent in consideration of a coating thickness of the slurry and manufacturing yield.

Various types of binder polymers, such as a polyvinylidene fluoride-hexafluoropropylene copolymer (PVDF-co-HEP), polyvinylidene fluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polyacrylate, an ethylene-propylene-diene monomer (EPDM), a sulfonated EPDM, a styrene-butadiene rubber (SBR), a fluorine rubber, poly (acrylic acid), polymers in which hydrogens thereof are substituted with lithium (Li), sodium (Na), or calcium (Ca), or various copolymers, may be used as the binder.

Any conductive agent may be used without particular limitation so long as it has suitable conductivity without causing adverse chemical changes in the batteries. For example, the conductive agent may include a conductive material such as: graphite such as natural graphite and artificial graphite; carbon black such as acetylene black, Ketjen black, channel black, furnace black, lamp black, and thermal black; conductive fibers such as carbon fibers and metal fibers; conductive tubes such as carbon nanotubes; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives.

An aqueous-based dispersant or an organic dispersant, such as N-methyl-2-pyrrolidone, may be used as the dispersant.

Also, the present invention provides a secondary battery including the cathode, an anode, and a separator disposed between the cathode and the anode.

A carbon material, lithium metal, silicon, or tin, which may intercalate and deintercalate lithium ions, may be typically used as an anode active material that is used in the anode according to an embodiment of the present invention. For example, the carbon material may be used and both low crystalline carbon and high crystalline carbon may be used as the carbon material. Typical examples of the low crystalline carbon may be soft carbon and hard carbon, and typical examples of the high crystalline carbon may be natural graphite, Kish graphite, pyrolytic carbon, mesophase pitch-based carbon fibers, meso-carbon microbeads, mesophase pitches, and high-temperature sintered carbon such as petroleum or coal tar pitch derived cokes.

Furthermore, the anode collector is generally fabricated to have a thickness of 3 μm to 500 μm. The anode collector is not particularly limited so long as it has conductivity without causing adverse chemical changes in the batteries. The anode collector may be formed of, for example, copper, stainless steel, aluminum, nickel, titanium, fired carbon, copper or stainless steel that is surface-treated with one of carbon, nickel, titanium, silver, or the like, an aluminum-cadmium alloy, or the like. Also, like the cathode collector, the anode collector may have a fine roughness surface to improve bonding strength of an anode active material. The anode collector may have various shapes such as a film, a sheet, a foil, a net, a porous body, a foam body, a non-woven fabric body, and the like.

Similar to the cathode, a binder and a conductive agent, which are typically used in the art, may be used in the anode. An anode active material and the above additives are mixed and stirred to prepare an anode active material slurry. Then, a current collector is coated therewith and pressed to prepare the anode.

Also, a typical porous polymer film used as a typical separator, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith as the separator. Also, a typical porous nonwoven fabric, for example, a nonwoven fabric formed of high melting point glass fibers or polyethylene terephthalate fibers may be used. However, the present invention is not limited thereto.

A lithium salt, which may be included as the electrolyte used in the present invention, may be used without limitation so long as it is typically used in an electrolyte for a lithium secondary battery. For example, any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3^-)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ may be used as an anion of the lithium salt.

The electrolyte used in the present invention may include an organic liquid electrolyte, an inorganic liquid electrolyte, a solid polymer electrolyte, a gel-type polymer electrolyte, a solid inorganic electrolyte, and a molten inorganic electrolyte, which may be used in the preparation of a lithium secondary battery. However, the present invention is not limited thereto.

A shape of the lithium secondary battery of the present invention is not particularly limited, and for example, a cylindrical type using a can, a prismatic type, a pouch type, or a coin type may be used.

The lithium secondary battery according to the present invention may not only be used in a battery cell that is used as a power source of a small device, but may also be used as a unit cell in a medium and large sized battery module including a plurality of battery cells.

Preferred examples of the medium and large sized device may be an electric vehicle, a hybrid electric vehicle, a plug-in hybrid electric vehicle, or a power storage system, but the medium and large sized device is not limited thereto.

Hereinafter, the present invention will be described in detail, according to specific examples. The invention may, however, be embodied in many different forms and should not be construed as being limited to the embodiments set forth herein. Rather, these example embodiments are provided so that this description will be thorough and complete, and will fully convey the scope of the present invention to those skilled in the art.

EXAMPLES

Hereinafter, the present invention will be described in more detail, according to examples and experimental examples. However, the present invention is not limited thereto.

Preparation Example 1: Preparation of Al-Containing Polycrystalline Manganese Precursor $MnSO_4$ and $AlSO_4$ were mixed at a ratio of 98:2, and $MnSO_4.7H_2O$ including 2M $AlSO_4$ was then prepared using distilled water subjected to $N_2$ purging. The prepared $MnSO_4.7H_2O$ was introduced into a continuous stirred tank reactor (CSTR, CSTR-L0, EMS Tech) at a rate of 250 mL/h.

A pH value of the solution was maintained to be 10.5 using a pH meter and a controller while introducing an 40% sodium hydroxide aqueous solution as an alkalizing agent at a rate of 230 mL/h to 250 mL/h through a sodium hydroxide aqueous solution supply unit of the reactor and a 25% ammonia solution at a rate of 30 mL/h through an ammonia solution supply unit of the reactor. A temperature of the reactor was set to be 40° C., a retention time (RT) was controlled to be 10 hours, and stirring was performed at a speed of 1,200 rpm to precipitate as $Mn_3O_4$ including Al.

The reaction solution thus obtained was filtered through a filter and purified with distilled water. Then, an additional process of drying was performed to prepare $(Mn_{0.95}Al_{0.05})_3O_4$ including Al. The $(Mn_{0.95}Al_{0.05})_3O_4$ was in the form of secondary particles in which two or more primary particles were agglomerated, had an average particle diameter of 5 μm, and contained about 2.1 wt % of Al.

Preparation of Polycrystalline Lithium Manganese Oxide Particles

Example 1

Step (i): Obtaining Polycrystalline Manganese Precursor Coated with Sodium-Containing Compound 0.62 g of sodium carbonate was dissolved in 1 L of ethanol, and both the solution thus prepared and 141.88 g of the $(Mn_{0.95}Al_{0.05})_3O_4$ having an average particle diameter of 5 μm prepared in Preparation Example 1 were then put in a 1 L bottle and stirred at 400 rpm for 1 hour. The mixed solution thus obtained was centrifuged and then dried at 150° C. for 24 hours to obtain polycrystalline manganese precursor coated with a sodium-containing compound.

Step (ii): Obtaining Cathode Active Material Having Sodium-Containing Coating Layer on the Surface Thereof 135 g of the polycrystalline manganese precursor coated with a sodium-containing compound obtained in step (i) and 37.50 g of $Li_2CO_3$ as a lithium precursor were put in a mixer (Waring blender) and mixed at a speed of the center of the mixer of 18,000 rpm for 1 minute to obtain a precursor mixture.

The precursor mixture thus obtained was put in a 500 cc alumina crucible and sintered at about 800° C. for 4 hours in an air atmosphere.

A cake obtained after the sintering was ground in a mortar and then classified using a 400 mesh sieve to obtain $Li_{1.09}Mn_{1.81}Al_{0.1}O_4$ having a coating layer including $Na_2O$ on the surface thereof.

The $Li_{1.09}Mn_{1.81}Al_{0.1}O_4$ having a coating layer was secondary particles composed of two or more crystal particles (primary particles) having an average crystal diameter of 165 nm, wherein an average particle diameter of the secondary particle was 10 μm. Also, a thickness of the coating layer was 100 nm.

Example 2

37.50 g of $Li_2CO_3$, 141.88 g of $(Mn_{0.95}Al_{0.05})_3O_4$ having an average particle diameter of 5 μm prepared in Preparation Example 1, 0.62 g of sodium carbonate were put in a mixer (Waring blender) and mixed at a speed of the center of the mixer of 18,000 rpm for 1 minute. The mixed powder was put in a 500 cc alumina crucible and sintered at about 700° C. for 4 hours in an air atmosphere. A cake obtained after the sintering was ground in a mortar and then classified using a 400 mesh sieve to obtain $Li_{1.09}Mn_{1.81}Al_{0.1}O_4$ having a coating layer including $Na_2O$ on the surface thereof.

The $Li_{1.09}Mn_{1.81}Al_{0.1}O_4$ having a coating layer was secondary particles composed of two or more crystal particles (primary particles) having a crystal diameter of 180 nm, wherein an average particle diameter of the secondary particle was 9.5 μm. Also, a thickness of the coating layer was 100 nm.

Comparative Example 1

$Li_{1.09}Mn_{1.81}Al_{0.1}O_4$ was obtained in the same manner as in Example 1 except that step (i) of Example 1 was not performed and an uncoated polycrystalline manganese precursor was used in step (ii) instead of using a polycrystalline manganese precursor coated with a sodium-containing compound.

Comparative Example 2

$LiMn_2O_4$ having a coating layer including $Na_2O$ was obtained in the same manner as in Example 1 except that single crystal $Mn_3O_4$ was used as a manganese precursor instead of using the polycrystalline $(Mn_{0.95}Al_{0.05})_3O_4$ prepared in Preparation Example 1.

The $LiMn_2O_4$ having a coating layer was a single crystal, wherein the particle diameter thereof was in a range of 5 μm to 10 μm. Also, a thickness of the coating layer was 100 nm.

Preparation of Lithium Secondary Battery

Example 3

Cathode Preparation

A cathode mixture slurry was prepared by adding 94 wt % of the cathode active material prepared in Example 1, 3 wt % of carbon black as a conductive agent, and 3 wt % of polyvinylidene fluoride (PVdF) as a binder to N-methyl-2-pyrrolidone (NMP) as a solvent. An about 20 μm thick aluminum (Al) thin film as a cathode collector was coated with the cathode mixture slurry and dried, and the Al thin film was then roll-pressed to prepare a cathode.

Anode Preparation

An anode active material slurry was prepared by mixing 96.3 wt % of carbon powder as an anode active material, 1.0 wt % of super-p as a conductive agent, and 1.5 wt % of styrene-butadiene rubber (SBR) and 1.2 wt % of carboxymethyl cellulose (CMC) as a binder, and adding the mixture to NMP as a solvent. A 10 μm thick copper (Cu) thin film as an anode collector was coated with the anode active material slurry and dried, and the Cu thin film was then roll-pressed to prepare an anode.

Non-Aqueous Electrolyte Solution Preparation

A 1 M $LiPF_6$ non-aqueous electrolyte solution was prepared by adding $LiPF_6$ to a non-aqueous electrolyte solvent that was prepared by mixing ethylene carbonate and diethyl carbonate, as an electrolyte, at a volume ratio of 30:70.

Lithium Secondary Battery Preparation

A mixed separator of polyethylene and polypropylene was disposed between the cathode and anode thus prepared, and a polymer type battery was then prepared by a typical method. Then, the preparation of each lithium secondary battery was completed by injecting the prepared non-aqueous electrolyte solution.

Example 4

A lithium secondary battery was prepared in the same manner as in Example 3 except that the cathode active material prepared in Example 2 was used.

Comparative Examples 3 and 4

Lithium secondary batteries were prepared in the same manner as in Example 3 except that the cathode active materials prepared in Comparative Examples 1 and 2 were respectively used.

Experimental Example 1: Scanning Electron Microscope (SEM) Image

SEM images were respectively obtained from the cathode active materials prepared in Examples 1 and 2 and Comparative Examples 1 and 2, and the results thereof are presented in FIGS. 2 to 5, respectively.

Figure 2:
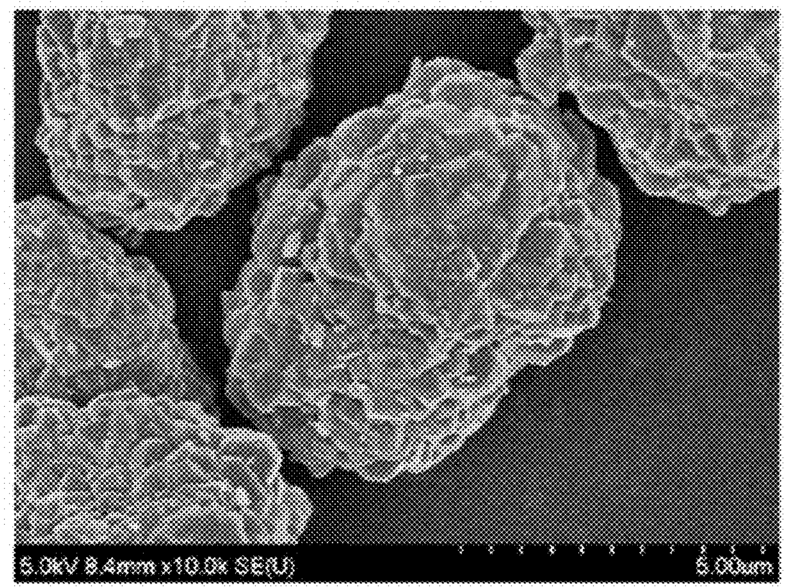
FIG. 2 illustrates a scanning electron microscope (SEM) image of a cathode active material prepared in Example 1 of the present invention.
Figure 3:
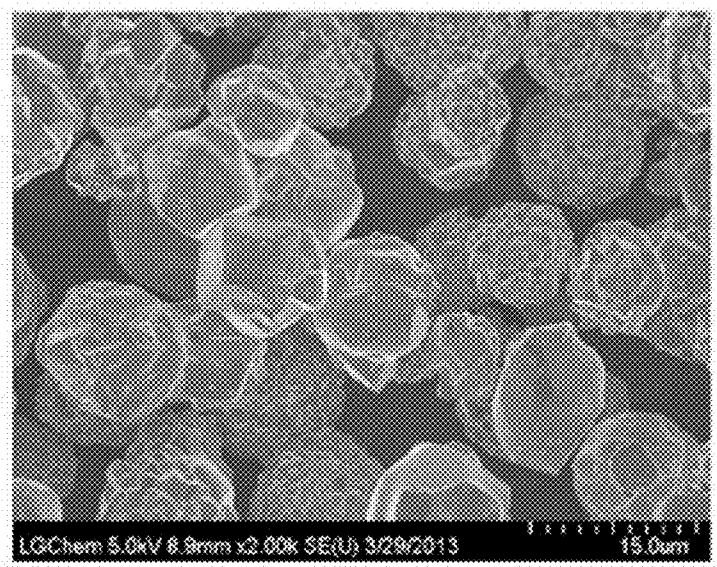
FIG. 3 illustrates an SEM image of a cathode active material prepared in Example 2 of the present invention.

Specifically, as illustrated in FIGS. 2 and 3, it may be identified that the cathode active materials prepared according to Examples 1 and 2 of the present invention had a sodium-containing coating layer on the surface of the polycrystalline lithium manganese oxide and had curved round edges (corners).

Figure 4:
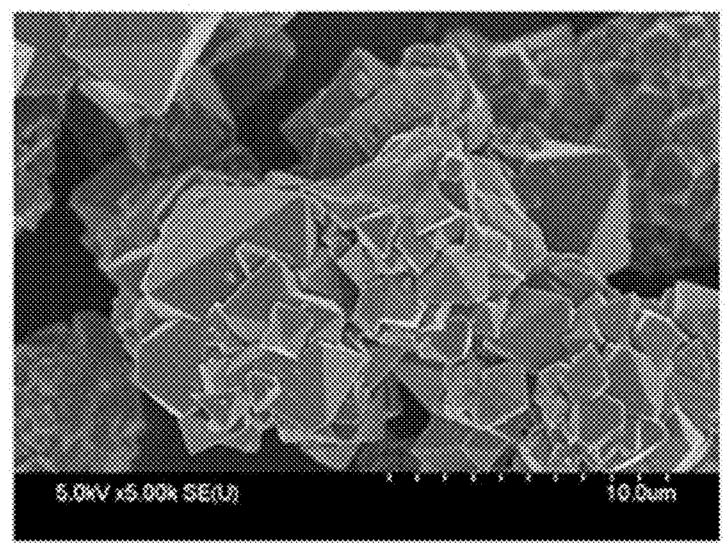
FIG. 4 illustrates an SEM image of a cathode active material prepared in Comparative Example 1 of the present invention.

In contrast, as illustrated in FIG. 4 which illustrates an SEM image of the cathode active material of Comparative Example 1, with respect to the surface of the cathode active material using the polycrystalline manganese precursor on which a sodium-containing compound was not coated, it was observed that particles had sharper edges (corners) than particles of FIGS. 2 and 3. In this case, it may be estimated that the dissolution of manganese may occur due to the sharp edges of the particles.

Figure 5:
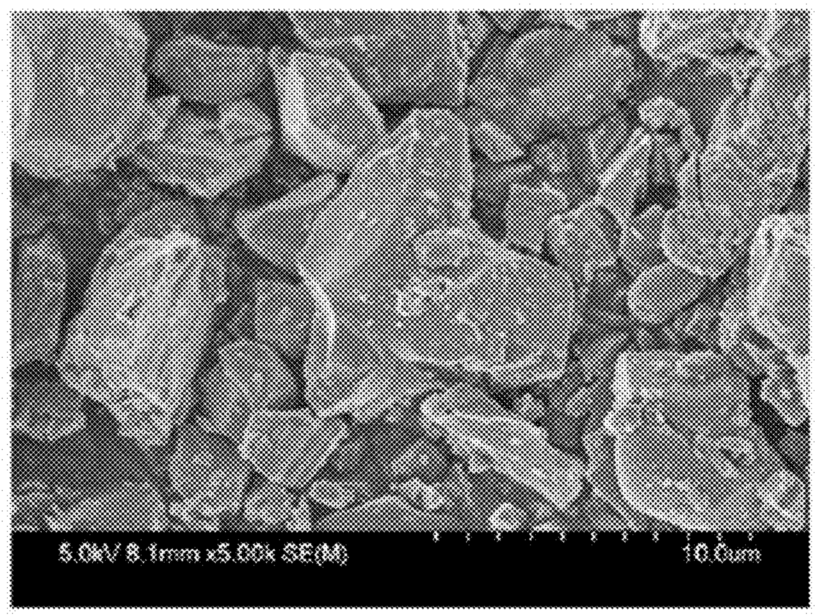
FIG. 5 illustrates an SEM image of a cathode active material prepared in Comparative Example 2 of the present invention.

Also, as illustrated in FIG. 5 which illustrates a surface SEM image of $LiMn_2O_4$ having a coating layer in which the single crystal manganese precursor was used as in Comparative Example 2, particles had round edges (corners) due to the use of a sintering aid, but it may be understood that the shape and size of the particles were non-uniform and, different from the SEM images of FIGS. 2 and 3, the particles were in the form of primary particles instead of the form of secondary particles in which primary particles were agglomerated.

Experimental Example 2: X-Ray Diffraction Analysis

X-ray diffraction analysis was performed on the polycrystalline lithium manganese oxide particles prepared in Examples 1 and 2 and Comparative Examples 1 and 2. The results thereof are presented in Table 1 below.

TABLE 1

| | (111)/(111) | (311)/(111) | (400)/(111) | (440)/(111) |
|---|---|---|---|---|
| Example 1 | 100.0 | 46.2 | 45.5 | 28.4 |
| Example 2 | 100.0 | 45.5 | 45.1 | 28.1 |
| Comparative Example 1 | 100.0 | 30.5 | 13.1 | 13.8 |
| Comparative Example 2 | 100.0 | 37.2 | 36.7 | 22.5 |

As illustrated in Table 1, in the X-ray diffraction analysis of the cathode active materials prepared in Examples 1 and 2, it may be identified that the cathode active materials may have a structure, in which (311), (400), and (440) planes were particularly grown with respect to a (111) plane, in comparison to Comparative Examples 1 and 2.

Specifically, with respect to the cathode active materials of Examples 1 and 2, when the peak intensity ratio of I(111)/I(111) was determined as 100% in the X-ray diffraction analysis, I(311)/I(111) was 45% or more, I(400)/I(111) was 45% or more, and I(440)/I(111) was 28% or more.

In contrast, with respect to Comparative Example 1, when the peak intensity ratio of I(111)/I(111) was determined as 100%, I(311)/I(111) was about 30.5%, I(400)/I(111) was about 13.1%, and I(440)/I(111) was about 13.8%, and thus, it may be confirmed that crystallinity was significantly decreased in comparison to Examples 1 and 2. In particular, it may be confirmed that the peak intensity ratios of I(400)/I(111) of Examples 1 and 2 were significantly increased by 3 times or more that of Comparative Example 1.

Similarly, with respect to Comparative Examples 2, when the peak intensity ratio of I(111)/I(111) was determined as 100%, I(311)/I(111) was about 37.2%, I(400)/I(111) was about 36.7%, and I(440)/I(111) was about 22.5%, and thus, it may be confirmed that crystallinity was decreased by 20% or more in comparison to Examples 1 and 2.

Experimental Example 3: Electrochemical Experiments

The lithium secondary batteries (battery capacity: 3.4 mAh) prepared in Examples 3 and 4 and Comparative Examples 3 and 4 were charged at a constant current (CC) of 2 C under constant current/constant voltage (CC/CV)

conditions, and thereafter, charge in the first cycle was performed by charging the lithium secondary batteries at a constant voltage (CV) to a current of 0.17 mAh. After the batteries were left standing for 20 minutes, discharge capacities in the first cycle were measured by discharging the batteries at a constant current of 0.1 C to a voltage of 10 mV. Subsequently, with respect to each battery, the charge and discharge were repeated to measure capacity, and the results thereof are presented in Table 2 below.

TABLE 2

| Category | Example 3 | Example 4 | Comparative Example 3 | Comparative Example 4 |
|---|---|---|---|---|
| Charge capacity [mAh/g] | 105.8 | 105.4 | 85.4 | 104.9 |
| Discharge capacity [mAh/g] | 104.1 | 103.9 | 84.4 | 102.4 |
| $1^{st}$ efficiency [%] | 98.40 | 98.6 | 98.8 | 97.6 |
| C-rate [2.0 C/0.1 C] | 99.10 | 98.8 | 99.4 | 98.5 |

As illustrated in Table 2, it may be confirmed that the lithium secondary batteries of Examples 3 and 4, in which the cathode active materials having a sodium-containing coating layer on the surface thereof were used, had better charge and discharge capacity characteristics and efficiency characteristics than Comparative Example 3, in which the cathode active material not having a sodium-containing coating layer on the surface thereof was used, and Comparative Example 4 using the $LiMn_2O_4$ cathode active material having a coating layer.

That is, with respect to the lithium secondary batteries of Examples 3 and 4, charge and discharge capacities were improved by about 20% in comparison to the lithium secondary battery of Comparative Example 3 and were improved by about 1% in comparison to the lithium secondary battery of Comparative Example 4.

Also, initial efficiency and output characteristics of the lithium secondary batteries of Examples 3 and 4 were improved by about 0.6% to about 0.9% in comparison to those of the lithium secondary batteries of Comparative Examples 3 and 4.

Experimental Example 4: Tap Density Measurement

The cathode active materials obtained in Example 1 and Comparative Examples 1 and 2 were respectively charged into a container and, as a tap density of each cathode active material, an apparent density of particles was measured by vibrating under a predetermined condition.

Tap densities were respectively measured on the cathode active material having a sodium-containing coating layer on the surface of the polycrystalline lithium manganese oxide of Example 1, the cathode active material of Comparative Example 1 in which the coating layer is not included, and the cathode active material having a sodium-containing coating layer on the surface of the single crystal lithium manganese oxide of Comparative Example 2. The results of the tap densities are presented in Table 3 below.

TABLE 3

| | Tap density (g/cc) |
|---|---|
| Example 1 | 1.89 |
| Comparative Example 1 | 1.6 |
| Comparative Example 2 | 1.78 |

As illustrated in Table 3, with respect to the cathode active material having a sodium-containing coating layer on the surface thereof of Example 1, it may be understood that the tap density was improved in comparison to the cathode active material not having a sodium-containing coating layer on the surface thereof of Comparative Example 1 and the $LiMn_2O_4$ cathode active material having a coating layer of Comparative Example 2.

Specifically, in the case that the surface of the polycrystalline manganese precursor was uniformly coated with a sodium-containing compound, the friction between particles may be minimized and non-uniform particle growth may be controlled.

Thus, since the polycrystalline manganese oxide particles of the present invention obtained using the coated manganese precursor may have good crystallinity and may include a sodium-containing coating layer on the particles, the packing efficiency during rolling may be excellent.

In contrast, with respect to Comparative Examples 1 and 2, different from Example 1, it may be understood that the tap densities were decreased because an amount of non-uniform particles was increased.

Experimental Example 5: Crystal Size Measurement

Crystal diameters of the cathode active materials of Examples 1 and 2 and Comparative Example 1 were measured.

Specifically, about 5 g of the cathode active materials of Examples 1 and 2 and Comparative Example 1 were respectively put in a holder and the crystal diameter may be calculated by analyzing diffraction data obtained by irradiating each cathode active material with X-ray.

The crystal diameter may be calculated from a full width at half maximum of a main peak or three or more peaks, and the crystal diameter may correspond to an average crystal diameter of the primary particles of the polycrystalline lithium manganese oxide particles. The average crystal diameters of the primary particles of the polycrystalline lithium manganese oxide particles according to the above results are presented in Table 4 below.

TABLE 4

| Category | Example 1 | Example 2 | Comparative Example 1 |
|---|---|---|---|
| Crystal diameter (nm) | 165 | 180 | 143 |

As illustrated in Table 4, the average crystal diameters of the cathode active materials having a sodium-containing coating layer on the surface thereof of Examples 1 and 2 were in a range of 165 nm to 180 nm, but the average particle diameter of the cathode active material not having a sodium-containing coating layer on the surface thereof of Comparative Example 1 was 143 nm. From the above results, it may be understood that the crystal diameter may increase depending on whether the sodium-containing coating layer was included or not.

INDUSTRIAL APPLICABILITY

In the case that a cathode active material according to an embodiment of the present invention is used in a lithium secondary battery, the cathode active material may not only suppress side reactions between the cathode active material and an electrolyte solution, but may also improve tap density, life characteristics, and charge and discharge capacity characteristics of the secondary battery.

The invention claimed is:

1. A cathode active material comprising:

polycrystalline lithium manganese oxide represented by Chemical Formula 1

$$Li_{(1+x)}Mn_{(2-x-y)}Al_yO_{(4-z)}$$ <Chemical Formula 1> where x, y, and z respectively satisfy $0 \leq x \leq 0.2$, $0 < y \leq 0.2$, and $0 \leq z \leq 0.2$; and a sodium-containing coating layer comprising $Na_2O$ on a surface of the polycrystalline lithium manganese oxide, wherein a tap density of the cathode active material is in a range of 1.7 g/cc to 2.5 g/cc, and wherein the polycrystalline manganese oxide has a cubic structure.

2. The cathode active material of claim 1, wherein a thickness of the sodium-containing coating layer is in a range of 1 nm to 500 nm.

3. The cathode active material of claim 1, wherein the polycrystalline lithium manganese oxide particles are in a form of secondary particles in which two or more primary particles having an average crystal diameter of 152 nm to 300 nm are agglomerated.

4. The cathode active material of claim 3, wherein an average particle diameter ($D_{50}$) of the secondary particle is in a range of 3 μm to 20 μm.

5. The cathode active material of claim 1, wherein I(311)/I(111) of the cathode active material is 40% or more when a peak intensity ratio of I(111)/I(111) is defined as 100% in X-ray diffraction analysis.

6. The cathode active material of claim 1, wherein I(400)/I(111) and I(440)/I(111) of the cathode active material are respectively 40% or more and 20% or more when a peak intensity ratio of I(111)/I(111) is defined as 100% in X-ray diffraction analysis.

7. The cathode active material of claim 1, wherein a full width at half maximum (FWHM) of a (311) peak of the cathode active material in X-ray diffraction analysis is 0.3 degrees or less.

8. The cathode active material of claim 1, wherein a Brunauer-Emmett-Teller (BET) specific surface area of the cathode active material is in a range of 0.1 $m^2/g$ to 1.0 $m^2/g$.

9. The cathode active material of claim 1, wherein the lithium manganese oxide is doped with at least one sodium (Na) atoms of sodium-containing oxide, and the lithium manganese oxide has a concentration gradient in which an amount of the Na decreases from the surface of the lithium manganese oxide to inside thereof.

10. A cathode comprising the cathode active material of claim 1.

11. A lithium secondary battery comprising the cathode of claim 10.

* * * * *